(12) United States Patent
McQueen et al.

(10) Patent No.: US 9,928,465 B2
(45) Date of Patent: Mar. 27, 2018

(54) MACHINE LEARNING AND VALIDATION OF ACCOUNT NAMES, ADDRESSES, AND/OR IDENTIFIERS

(71) Applicant: AOL Inc., Dulles, VA (US)

(72) Inventors: Donald J. McQueen, Leesburg, VA (US); Lachlan A. Maxwell, Ashburn, VA (US)

(73) Assignee: Oath Inc., Dulles, VA (US)

( * ) Notice: Subject to any disclaimer, the term of this patent is extended or adjusted under 35 U.S.C. 154(b) by 818 days.

(21) Appl. No.: 14/282,097

(22) Filed: May 20, 2014

(65) Prior Publication Data

US 2015/0339583 A1    Nov. 26, 2015

(51) Int. Cl.
| | |
|---|---|
| *G06F 17/30* | (2006.01) |
| *G06N 5/04* | (2006.01) |
| *G06N 7/00* | (2006.01) |
| *H04L 12/58* | (2006.01) |
| *G06N 99/00* | (2010.01) |
| *H04L 29/06* | (2006.01) |

(52) U.S. Cl.
CPC ............ *G06N 5/048* (2013.01); *G06N 7/005* (2013.01); *G06N 99/005* (2013.01); *H04L 51/12* (2013.01); *H04L 63/126* (2013.01); *H04L 63/1466* (2013.01); *H04L 63/0236* (2013.01); *H04L 63/0245* (2013.01); *H04L 63/1425* (2013.01)

(58) Field of Classification Search
CPC ........ G06F 21/31; G06F 21/41; G06F 21/552; G06F 2221/2113; G06F 2221/2117; G06N 99/005; G06N 5/048; G06N 7/005; G06Q 10/107

USPC .......................................... 706/12
See application file for complete search history.

(56) References Cited

U.S. PATENT DOCUMENTS

| | | | | | |
|---|---|---|---|---|---|
| 5,619,648 | A | * | 4/1997 | Canale ................. | G06Q 10/107 709/206 |
| 5,742,769 | A | * | 4/1998 | Lee ....................... | G06Q 10/107 707/999.1 |
| 5,999,932 | A | * | 12/1999 | Paul ...................... | G06Q 10/107 |
| 5,999,967 | A | * | 12/1999 | Sundsted ............. | G06Q 10/107 705/14.1 |
| 6,023,723 | A | * | 2/2000 | McCormick ......... | G06Q 10/107 707/999.001 |
| 6,161,130 | A | * | 12/2000 | Horvitz ............. | G06F 17/30707 707/999.005 |

(Continued)

FOREIGN PATENT DOCUMENTS

EP        1 492 283 A2    12/2004

OTHER PUBLICATIONS

European Search Report, dated Sep. 29, 2015; Issued in EP 15168289.5-1870, 7 pages.

*Primary Examiner* — Sheree Brown
(74) *Attorney, Agent, or Firm* — Bookoff McAndrews, PLLC (57) ABSTRACT

Systems and methods are disclosed for determining if an account identifier is computer-generated. One method includes receiving the account identifier, dividing the account identifier into a plurality of fragments, and determining one or more features of at least one of the fragments. The method further includes determining the commonness of at least one of the fragments, and determining if the account identifier is computer-generated based on the features of at least one of the fragments, and the commonness of at least one of the fragments.

17 Claims, 4 Drawing Sheets

(56) References Cited

U.S. PATENT DOCUMENTS

| | | | |
|---|---|---|---|
| 6,199,102 B1* | 3/2001 | Cobb | H04L 51/12 709/202 |
| 6,249,805 B1* | 6/2001 | Fleming, III | G06Q 10/107 707/999.01 |
| 6,266,692 B1* | 7/2001 | Greenstein | G06Q 10/107 709/206 |
| 6,453,327 B1* | 9/2002 | Nielsen | G06Q 10/107 709/206 |
| 6,829,635 B1* | 12/2004 | Townshend | H04L 51/14 709/206 |
| 7,127,680 B2* | 10/2006 | Pang | G06Q 10/107 709/223 |
| 7,275,082 B2* | 9/2007 | Pang | G06Q 10/107 709/206 |
| 8,645,478 B2* | 2/2014 | Gaddala | G06Q 50/01 379/142.01 |
| 2002/0120600 A1* | 8/2002 | Schiavone | H04L 51/12 |
| 2002/0162025 A1* | 10/2002 | Sutton | G06F 21/50 726/4 |
| 2002/0199095 A1* | 12/2002 | Bandini | H04L 51/12 713/151 |
| 2004/0006600 A1* | 1/2004 | Miller | G06Q 10/107 709/206 |
| 2004/0073617 A1* | 4/2004 | Milliken | G06F 21/562 709/206 |
| 2004/0221062 A1* | 11/2004 | Starbuck | G06Q 10/107 709/246 |
| 2004/0249895 A1* | 12/2004 | Way | H04L 51/12 709/206 |
| 2004/0258044 A1* | 12/2004 | Girouard | H04L 51/12 370/352 |
| 2005/0021648 A1* | 1/2005 | Ogasawara | H04N 1/00209 709/206 |
| 2005/0022008 A1* | 1/2005 | Goodman | G06Q 10/107 726/4 |
| 2005/0081059 A1* | 4/2005 | Bandini | H04L 51/12 726/4 |
| 2005/0132197 A1* | 6/2005 | Medlar | H04L 51/12 713/176 |
| 2006/0036693 A1* | 2/2006 | Hulten | H04L 51/12 709/206 |
| 2006/0037070 A1* | 2/2006 | Davis | H04L 63/1458 726/11 |
| 2006/0095521 A1* | 5/2006 | Patinkin | G06Q 10/107 709/206 |
| 2006/0095966 A1* | 5/2006 | Park | H04L 51/12 726/22 |
| 2006/0149820 A1* | 7/2006 | Rajan | G06Q 10/107 709/206 |
| 2006/0253447 A1* | 11/2006 | Judge | G06F 21/554 |
| 2007/0011324 A1* | 1/2007 | Mehr | G06Q 10/107 709/225 |
| 2007/0118904 A1 | 5/2007 | Goodman | |
| 2008/0059590 A1* | 3/2008 | Sarafijanovic | G06Q 10/107 709/206 |
| 2008/0133682 A1* | 6/2008 | Chadwick | H04L 51/12 709/206 |
| 2008/0250503 A1* | 10/2008 | Bandini | G06Q 10/107 726/23 |
| 2010/0077043 A1* | 3/2010 | Ramarao | H04L 12/585 709/206 |
| 2013/0185230 A1* | 7/2013 | Zhu | G06Q 10/107 706/12 |
| 2014/0365206 A1* | 12/2014 | Convertino | G06F 17/2785 704/9 |

* cited by examiner

MACHINE LEARNING AND VALIDATION OF ACCOUNT NAMES, ADDRESSES, AND/OR IDENTIFIERS

TECHNICAL FIELD

The present disclosure relates generally to the field of electronic communications, and systems and methods for identifying or classifying data associated with one or more electronic accounts. More particularly, and without limitation, the present disclosure relates to systems and methods for identifying computer-generated account identifiers.

BACKGROUND

With the advent of the Internet and a decline in computer prices, many people are now communicating with one another through computers or other devices interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). Spam is akin to junk mail sent through the postal service. However, because spam e-mail requires neither paper nor postage, the costs incurred by the sender of spam e-mail are quite low when compared to the costs incurred by conventional junk mail senders. Further, senders of spam e-mail and other electronic communications may use software to generate account names and electronic communications. Due to this and other factors, e-mail and other network users are now exposed to a significant amount of spam content on a daily basis.

Spam communications impacts both service users and service providers. For service users, such as an e-mail user, spam can be disruptive, annoying, and time consuming. For a service provider, spam represents tangible costs in terms of storage and bandwidth usage. Additional costs may be incurred as network administrators work to limit and/or ban the activities of accounts that are used to send spam communications. These costs may be substantial.

Thus, particularly for large service providers, such as e-mail service providers (ESPs) and Internet service providers (ISPs), it is beneficial to stop spam before it enters the e-mail or other electronic communication system. Stopping unwanted electronic communications before they enter the system keeps down an ESP's storage and bandwidth costs and provides a better quality of service to the ESP's users. On the other hand, preventing the delivery of wanted e-mail and other electronic communications decreases the quality of service to the ESP's users, perhaps to an unacceptable degree, at least from the perspective of the users.

SUMMARY OF THE DISCLOSURE

According to certain embodiments, systems and methods are disclosed for identifying computer-generated account identifiers. One method includes: receiving the account identifier; dividing the account identifier into a plurality of fragments; determining one or more features of at least one of the fragments; determining the commonness of at least one of the fragments; and determining if the account identifier is computer-generated based on the features of at least one of the fragments, and the commonness of at least one of the fragments.

According to another embodiment of the present disclosure, a system includes: a data storage device storing instructions determining if an account identifier is computer-generated; and a processor configured to execute the instructions to perform a method including: receiving the account identifier; dividing the account identifier into a plurality of fragments; determining one or more features of at least one of the fragments; determining the commonness of at least one of the fragments; and determining if the account identifier is computer-generated based on the features of at least one of the fragments, and the commonness of at least one of the fragments.

According to another embodiment of the present disclosure, a non-transitory computer-readable medium storing instructions that, when executed by a processor, cause the processor to perform a method for determining whether an account identifier is computer-generated, the method including: receiving the account identifier; dividing the account identifier into a plurality of fragments; determining one or more features of at least one of the fragments; determining the commonness of at least one of the fragments; and determining if the account identifier is computer-generated based on the features of at least one of the fragments, and the commonness of at least one of the fragments.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems of validating account identifiers and electronic communications. Specifically, and without limitation, the present disclosure describes systems and methods for validating account identifiers to determine if an account name is computer-generated. As described above, each time a network service provider receives an electronic message, there is some likelihood that the electronic message is genuine and was generated by a person. There is also some likelihood that the electronic message is spam and was computer-generated. Often, network administrators or other personnel may be charged with banning computer-generated accounts. However the number of computer-generated accounts may vastly outnumber the genuine accounts. Embodiments presented herein are directed to evaluating at least one electronic communication and/or an account name to determine if the at least one account name is computer-generated. Automated methods that flag possible computer-generated accounts may greatly expedite the process of determining which accounts are to be banned, flagged, blocked, etc. Embodiments of the present disclosure will now be described with respect to FIGS. 1-4.

Figure 1:
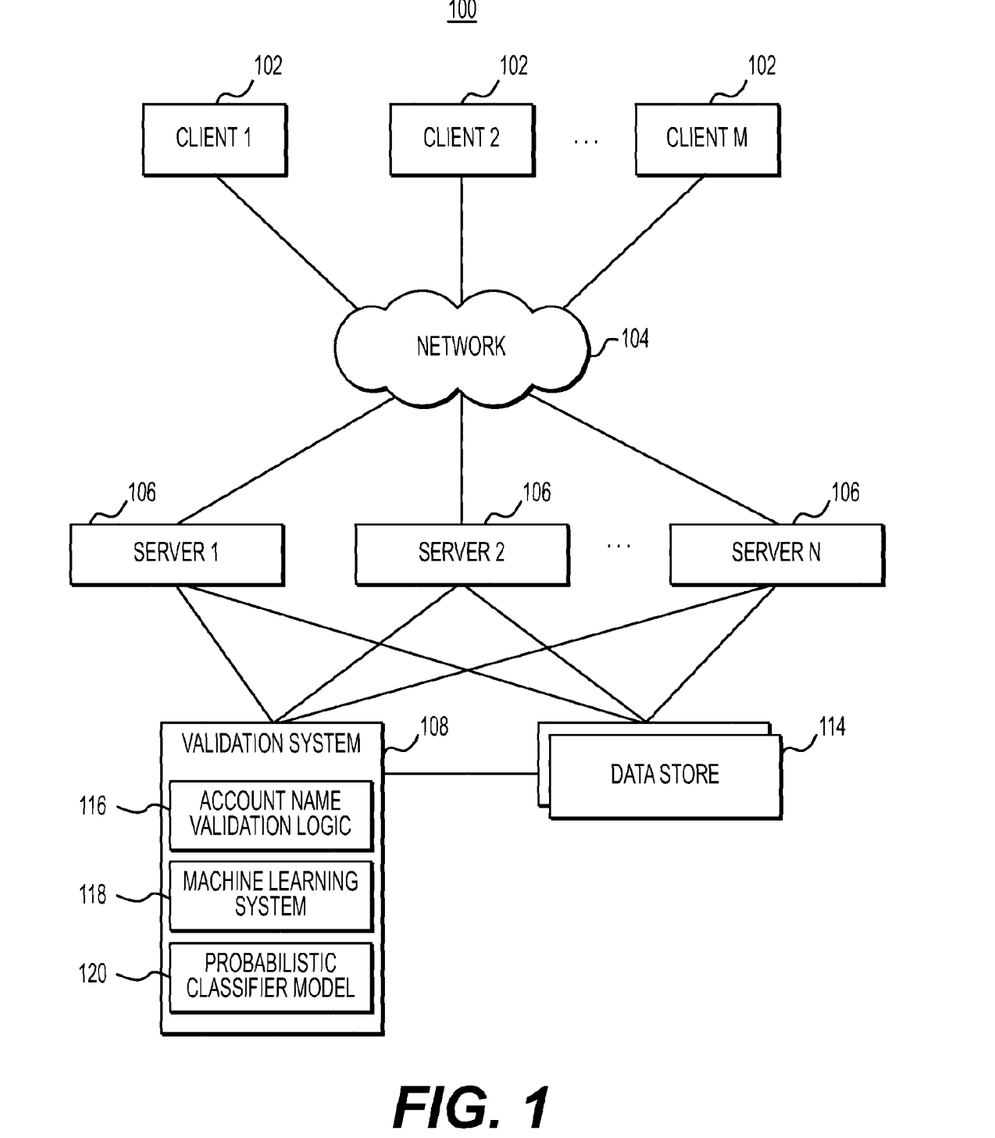
FIG. 1 is a block diagram of a communications system configured to perform account name validation, according to exemplary embodiments of the present disclosure.

FIG. 1 shows a block diagram of an exemplary electronic communications system 100 for implementing embodiments of the present disclosure, or aspects thereof. System 100 may include one or more clients 102 (e.g., Client 1, Client 2, . . . Client m). Clients 102 may be implemented with devices, and/or applications running thereon. By way of example, clients 102 may include personal computers, laptops, tablet computers, personal digital assistants, mobile telephones, smartphones, pagers, and/or other types of electronic communication devices. Clients 102 may be configured to communicate to and/or through network 104. In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, clients 102 may be configured to receive or initiate e-mail or other electronic communications, such as instant messaging, chat, text messaging, SMS messages, pager communications, blog posts, microblog posts, news items, etc. Such communications may be generated by clients 102 and may be transmitted through network 104 to appropriate servers, such as, for example, servers 106.

Servers 106 may include one or more servers (e.g., Server 1, Server 2, . . . Server n) configured to interact with the network 104, one or more data stores 114, and a validation system 108. In addition, consistent with some embodiments, servers 106 may be implemented as a server, a server system comprising a plurality of servers, or a server farm comprising a load balancing system and a plurality of servers. Servers 106 may be hardware, software, or a combination thereof. They may be web and/or e-mail servers.

The validation system 108 may include account name validation logic 116, a machine learning system 118, and a probabilistic classifier model 120. The account name validation logic 116 may process records from one or more of clients 102, servers 106, and/or data stores 114, and provide the processed records to a machine learning system 118 and/or the probabilistic classifier model 120. The machine learning system 118 may take in records from other network entities, such as the account name validation logic 116, in order to train the probabilistic classifier model 120 to accurately determine computer-generated account names and other computer-generated electronic data. For example, account name validation logic 116 may receive records from a data store 114, the records comprising a list of known genuine account names as well as known computer-generated account names. The account name validation logic 116 may process the records according to embodiments disclosed herein, and provide the records to the machine learning system 118. The machine learning system 118 may then automatically configure weights to be placed on various features of the account names in the probabilistic classifier model 120. After the probabilistic classifier model 120 is trained, the account name validation logic 116 may also receive one or more account names, from any network element of the system 100, including one or more data stores 114, that are not known to be genuine or computer-generated. The account name validation logic 116 may determine, either itself or after communicating with the probabilistic classifier model 120, whether the account name is genuine.

In certain embodiments, servers 106 may also be configured to interact with a data store 114. The data store 114 may include one or more logically and/or physically separate databases configured to store data. The data stored in data store 114 may be received from servers 106, from the validation system 108, and/or from any entity on the network 104. The data stored in the data store 114 may take various forms including, but not limited to, account names, e-mails, instant messages, chat messages, text messages, SMS messages, pager communications, blog posts, news items, addresses, account names or other identifiers, and other electronic communications, user-generated content, or any combination thereof.

In some embodiments, validation system 108 and/or the data store 114 may be implemented using a single computer, server, and/or network element. The validation system 108 and/or the data store 114 may also be implemented on one or more servers 106. In other embodiments, the data store 114 and/or data stored on validation system 108 may be maintained in a network attached storage device, in a storage area network, or combinations thereof, etc. Furthermore, data stored on the validation system 108 and/or the data store 114 may be maintained and queried using numerous types of database software and programming languages, such as SQL, MySQL, IBM DB2®, Microsoft Access®, PERL, C/C++, Java®, etc.

Although the above description describes clients and servers separately, clients may perform the role of servers and vice-versa. Additionally, clients 102 may have the same hardware components as servers 106. Furthermore, the embodiments of this disclosure may also be implemented on the same device serving both as a client and a server.

As discussed above, automated methods that identify possible computer-generated accounts may greatly expedite the process of determining which accounts are to be banned, flagged, blocked, etc. Machine-learning systems are useful for identifying correlations in large data sets, and automatically creating weights according to the importance of those correlations. This training process may be initiated with a training set of data, which may be a large number of account names known to be human and computer-generated. Pre-processing of training set data, and any data provided to the validation system 108, may greatly enhance the accuracy and usefulness of the system.

There are a variety of data pre-processing steps that may enhance the accuracy of the validation system 108. For example, humans tend to create account names that they can remember. As a result, human-created account names may tend to reuse words, letter and number sequences, and special character patterns such as punctuation mark tendencies. Computer-generated account names, in contrast, may use recognizable words in an attempt to appear human, but may also use randomized sequences of alphanumeric characters. As an example, a human might select a username "john123." The fragment "john" may be a very commonly used fragment by both account names that are known to be genuine and known computer-generated account names. The fragment "123," on the other hand, may be less common, but not unique. In contrast, software that generates account names might select "john3563x13." The software may be programmed to use "john," a known common component of valid account names, in order to appear more human. However, the fragment "3563x13" might be extremely rare, if not unique. As a result, it may be the case that account names containing both a common and a very rare or unique fragment are more likely to be computer-generated. Alternatively, regardless of the presence of common fragments in the account name, if one or more rare or unique tokens exist in the username, this may increase the confidence that the account is not genuine. Thus, in order to determine the commonness of fragments in an account name, "shingling," i.e., creating fragments of an account name, may be useful in determining whether it is computer-generated. It may also be useful to rank and classify fragments by commonality when compared with, for example, a large data store of account names.

While an account name may be shingled into fragments of varying lengths, it may be the case that fragments outside of a certain size are not helpful in determining whether or not an account name is computer-generated. User account names tend to vary in length between three and twenty characters. Fragments that are very small or very large relative to the size of the account name may not provide any additional confidence as to whether the account is computer-generated. As a result, fragment sizes may be limited to those between three and eight characters, for example, or between two and ten, etc.

There may also be one or more correlations between the frequency and combination of character types and whether an account is computer-generated. For example, the frequency of consonants, vowels, numbers, and punctuation marks may all tend to differ between a human and a computer imitator. Thus, hashing usernames and fragments thereof by character type during pre-processing may be useful. Further, recording the counts of each character type for an account name and/or fragments thereof may be useful.

Correlations may also exist between consonants used, and the ordering thereof, and whether an account name is computer-generated. As a result, it may be useful to remove vowels, numbers, and/or punctuation marks from an account name and/or fragments thereof during pre-processing in order to produce a list of consonants for analysis by the validation system 108.

During the training phase, the machine learning system 118 may be provided the account name, fragments thereof, and data about one or more of the features of the fragments discussed above (e.g., fragment frequencies, consonant properties, hashed account name features, etc.). After training, the account name validation logic 116 may be provided the fragments, which may itself, or by using the now trained probabilistic classifier model 120, determine if an account name is likely to be computer-generated.

Figure 2:
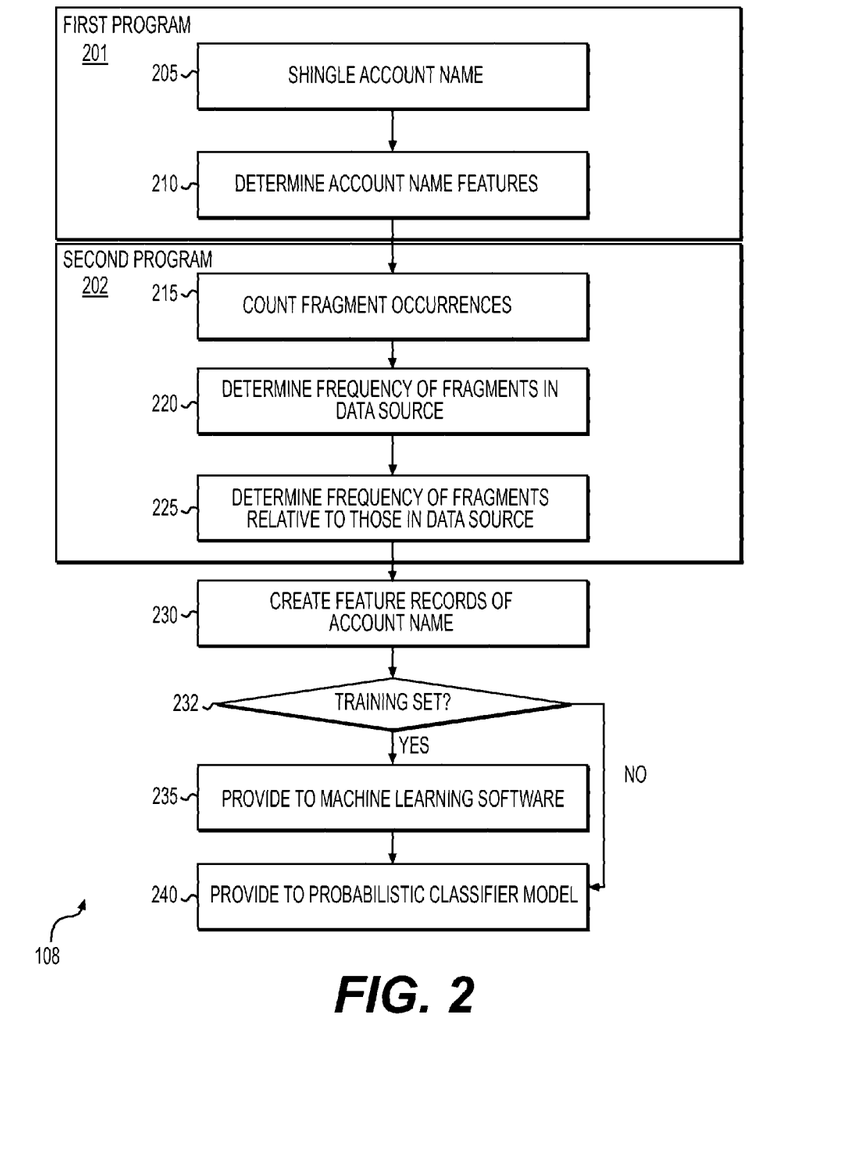
FIG. 2 is a flow diagram of methods for performing account name validation, according to exemplary embodiments of the present disclosure.

FIG. 2 is a flow diagram of methods for performing account name validation, according to exemplary embodiments of the present disclosure. At step 205, the account name may be shingled into fragments of various lengths. Alternatively, or additionally, the account name and/or fragments thereof may be hashed by character type. As an example, consonants may be hashed as As, vowels as Bs, numbers as Cs, and punctuation marks as Ds, as shown in Table 1. The hashing methodology may vary. For example, alphanumeric characters may be hashed as As, and punctuation as Bs, etc. Multiple hashings using differing methodologies may also be performed in parallel. Alternatively, or additionally, the account name may be truncated, for example, to remove characters other than consonants, also as shown in Table 1. Other types of characters may be removed by truncation, and multiple truncations may be performed in parallel to generated additional fragments for analysis.

TABLE 1

| Type | Value | Description |
| --- | --- | --- |
| Account Name (AN) | john_smith10 | The normal screen name, unmodified |
| Hashed AN | abaadaabaacc | Consonant = a, Vowel = b, Number = c, Punctuation = d |
| Truncated AN | jhnsmth | Remove everything but the consonants |

Examples of shingled, hashed and truncated screen name fragments are shown in Table 2. As discussed above, since account names tend to be between four and twenty characters in length, fragments may be limited to between, for example, three and seven characters in size, since fragment sizes outside of this range may not substantially contribute to the determination of whether an account name is genuine. Additionally, small fragment sizes, such as fragments of two characters, may cause so many fragments to be generated that the validation system 108 is slowed considerably. The pre-determined fragment sizes generated may manually or automatically change, for example based upon properties of the training set, such as average account name length, received from the data store 114. Fragments receiving differing types of processing may be fragmented in varying sizes. For example, truncated account names may be fragments between three and six characters in size, as shown in Table 2.

TABLE 2

| Type | Fragment Size | Feature Values (showing only the length 5's) |
| --- | --- | --- |
| Account Name (AN) | 3's, 4's, 5's, 6's, 7's | john_, ohn_s, hn_sm, n_smi, _smit, smith, mith1, ith10 |
| Hashed AN | 3's, 4's, 5's, 6's, 7's | abaad, baada, aadaa, adaab, daaba, aabaa, abaac, baacc |
| Truncated AN | 3's, 4's, 5's, 6's | jhnsm, hnsmt, nsmth |

At step 210, each account name, and various types and fragments thereof, may constitute feature values (also known as tokens) which may be provided to the machine learning system 118, both for training and real-world purposes. Additional feature values may be obtained from the full account name. For example, the number of each character type may be counted and/or ordered, as shown in Table 3. The feature values in Table 3 are shown as human-readable values, although in the validation system 108, other values may be used.

TABLE 3

| Account Name | Breakdown | Feature Values (human-readable version) |
| --- | --- | --- |
| john_smith10 | 7 con, 2 vow/ num, 1 pun | Con, Con, Con, Con, Con, Con, Con, Vow, Vow, Num, Num, Pun |

Steps 205 and 210 illustrate a series of steps for generating example feature values which can be extracted from the account name itself, without having to compare the account name to others, and is herein labeled the "first program." After completion of the first program 201, additional feature values may be determined in a "second program" 202 by comparing the account name and fragments thereof to other account names, such as, account names known to be either human or computer-generated during the training process.

The second program 202 may run a series of analytics to establish frequencies and significance thresholds for the fragments feature values identified in the first program 201. At step 215, the contents of a data set, such as a training set from the data store 114, may be searched for occurrences of the account name, and/or one or more fragments thereof. An index may be created indicating the number of times the account name and/or one or more fragments appear in the data set. For example, "john_" may appear 1000 times, "_smit" may appear 600 times, and "ith10" may appear 42 times. At this point, however, the significance of the number of these occurrences may not be clear, as the size and content of the data set may vary.

At step 220, the data set may be statistically analyzed to determine the significance of these fragment occurrences. Of the various account names and fragments that exist in the data set, for example, it may be determined that fragments that appear more than 1300 times, e.g., are in the 99th percentile. Fragments that appear more than 750 times may be, e.g., in the 95th percentile, and so on. Fragments that appear fewer than ten times in the data set may be classified as "rare," and only one occurrence may be classified as unique. The threshold of a "rare" designation, and other categories, may be based upon the number of fragments in the data store 114, and may be set by a user, or automatically set by the system 100 based upon the size and/or composition of the data store 114. While percentiles are listed to categorize the relative frequencies of various fragments in the data set, alternative classification methodologies are possible. For example, each fragment may be assigned a numerical value of, e.g., 1-10 based on commonness in the data store 114. Alternatively, a given fragment may simply be categorized as "rare," "medium," or "common." Fragments may also not be categorized at all. Instead, raw frequency data for one or more fragments of one or more account names may be given to a machine learning system 118 or probabilistic classifier model 120 for further processing. All fragments in the data store 114 may be counted in order to determine the threshold for each category. Alternatively, a smaller number of fragments in the data store 114 may be counted to determine each threshold, for example a statistically significant subset.

At step 225, the level of significance of each fragment determined in the first program, based on the calculated thresholds of step 220, may be determined. For example, "john_" may appear 1000 times, and would thus be in the 95th percentile for commonness among fragments in the data store 114. The fragment "ith10" may only appear 42 times, which may be neither a rare nor common token, and so on.

At step 230, one or more feature records may be created that associate at least one of the learned features about each fragment. Features such as size, commonness, whether it is hashed or truncated, etc. may be included. The features may be combined into a single feature record, possibly using a code that may or may not be human-readable. For example, the fragment "john_" may be associated with a feature record code "std5_95th," which may mean a standard or unmodified fragment of length five that is in the 95th percentile of commonness. As another example, "ith10" may be associated with a feature record code "std5_norm," which may mean a standard or unmodified fragment of length five that is neither common nor rare. As a further example, the fragment "xpcjq" may be associated with a feature record code "trn5_uniq" which may mean a truncated fragment of length five that is unique in the data store. All discovered features in the first and second programs are not necessarily combined into one feature record. Alternatively, one record may be created for each of the one or more features of a given fragment. Other feature record formats and groupings are within the scope of embodiments discussed herein.

At step 235, the one or more feature records for the one or more account names and/or fragments may be placed into key, value records organized by account name. Features may be stored as the values, with the screen names as keys. Key, value pair databases often may be processed faster than traditional relational databases, especially in big data environments. However, this step may be optional, as other database formats may be used. For example, lists of features associated with each fragment may be put into one or more tables and provided to any of the modules of the validation system 108.

While training a machine learning system 118 to differentiate genuine, human-created account names from computer-generated account names, steps 205-235 may be repeated for each account name in the training set. Records may be provided sequentially to modules of the validation system 108, or records may be compiled for more than one account name, and fed to modules of the validation system 108 as a batch.

As discussed above, the machine learning system 118, which may be scalable and/or distributed, may be used to train a probabilistic classifier model 120 using records from a training set. The machine learning algorithm may be operable to provide collaborative filtering, clustering, and/or classification. The machine learning algorithm may automatically adjust, in the probabilistic classifier model 120, weights placed on various feature records and fragment correlations to maximize the rate of correct prediction as to whether each account name is genuine or computer-generated. The probabilistic classifier model 120 may be, for example, a Naïve Bayes classifier model.

As shown by steps 232 and 240, once trained, the probabilistic classifier model 120 may be directly provided any number of account names to determine if they are likely computer-generated. For example, steps 205-232 may be performed on one or more additional account names in a production/live environment (where it is unknown whether the account name is human or computer-generated), the resulting one or more key, value records may be provided to the probabilistic classifier model 120 to obtain a result. Alternatively, the probabilistic classifier model 120 may be incorporated into or consumed by software, such as account name validation logic 116 software, which itself may be provided account names. The probabilistic classifier model 120 may generate a confidence score, wherein a given account name with a confidence score above a predetermined threshold may be designated as "real," and otherwise designated as "fake." Alternatively, there may be more than two possible results. For example, "very likely real," "somewhat likely real," "equally likely to be real and fake," "likely fake," each category with associated pre-determined confidence thresholds. The results may be presented in some other form, for example numeric. The pre-determined thresholds for the results determination may be user configurable, or may be set automatically.

Once an account is identified as likely to be computer-generated, the validation system 108 may cause the account name to be flagged for review, quarantined, and/or banned, etc. Depending on the confidence level that a user account is computer-generated, a user account may be subject to a variety of differing treatments. If there is a very high pre-determined confidence level that the account is computer-generated, the validation system 108 may cause the account to be automatically banned. If there is a lower pre-determined confidence level that the account is computer-generated, the validation system 108 may cause the account to be red-flagged for review, temporarily quarantined, subject to automated tests to verify that the account is active, such by as messaging the user, etc. If there is a still lower pre-determined confidence level that the account is computer-generated, possible suspicious activity may be logged, or the account may simply be considered genuine. Any variation of the above features are possible, including variations in the number of confidence thresholds that trigger certain actions, and variations in which actions are performed in response to determining a certain likelihood that the account is computer-generated.

Since the validation system 108 may utilize machine learning, new account names may be continuously or periodically provided to the machine learning system 118, which may allow the weights placed on various features to be automatically adjusted over time. This provides the system with flexibility, as typical account names in a set may change over time as the set matures and simpler account names are no longer available. This also allows for the system to adjust to changes in fraudulent account generation software.

Embodiments described herein may be implemented for identifying malicious and/or computer-generated content in e-mails, online content, blogs, microblogs, documents, and/or any other ostensibly user-generated electronic communications that, for example, arrive at servers 106. For example, a confidence level that an account name is not genuine may be considered along with a confidence level that the content of an associated electronic message is not genuine when determining whether to mark, discard, or place the e-mail in a spam folder. The first program 201 and second program 202 may be executed independently, or in combination with each other, as described above. The ordering of steps in embodiments discussed herein may vary. For example, step 220 may be performed at any time before step 225.

The output of the probabilistic classifier model 120 may be used internally by an organization, and not be visible to the public. Internally at an organization, the results could be consumed by a team in order to focus attention on users that are more likely human or computer, depending on the needs of the team. The validation system 108 may thus help focus the attention of administrators with limited resources. For example, in a user forum, user accounts that are deemed likely to be computer-generated may be reviewed first by human administrators over other accounts.

Using embodiments described herein, user account providers may be able to quickly know how much of their user base appears genuine. This may help account providers make decisions about changes that need to be made to user screening and other security measures.

Figure 3:
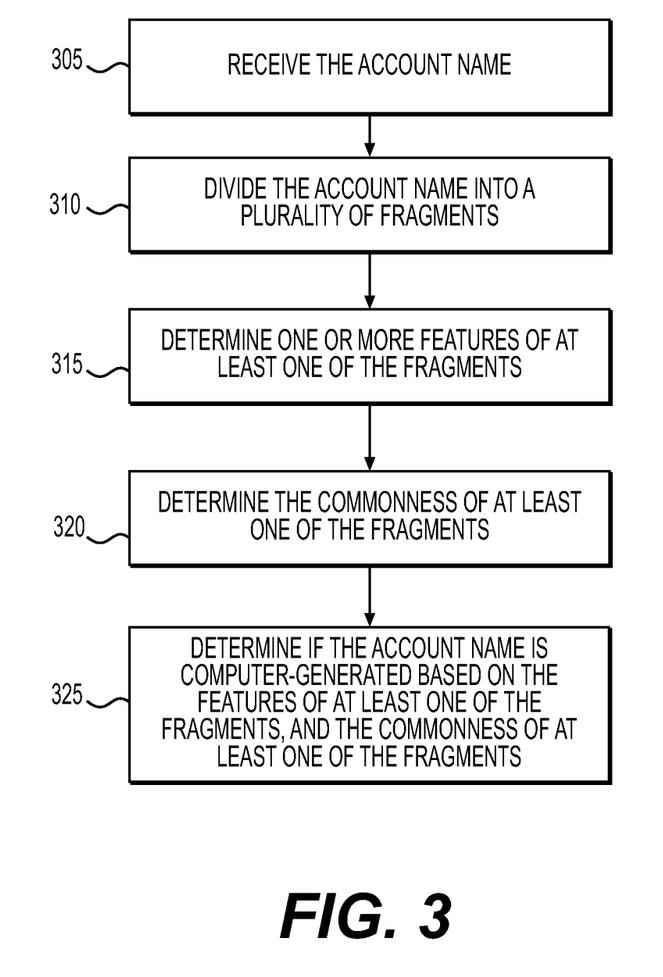
FIG. 3 is a flow diagram of an example method for performing account name validation, according to an exemplary embodiment of the present disclosure.

FIG. 3 is a flow diagram of a method for performing location-based authentication. At step 305, an account name is received. At step 310, the account name is divided into a plurality of fragments. At step 315, one or more features of at least one of the fragments are determined. At step 320, the commonness of at least one of the fragments is determined. At step 325, it is determined if the account name is computer-generated based on the features of at least one of the fragments, and the commonness of at least one of the fragments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

Figure 4:
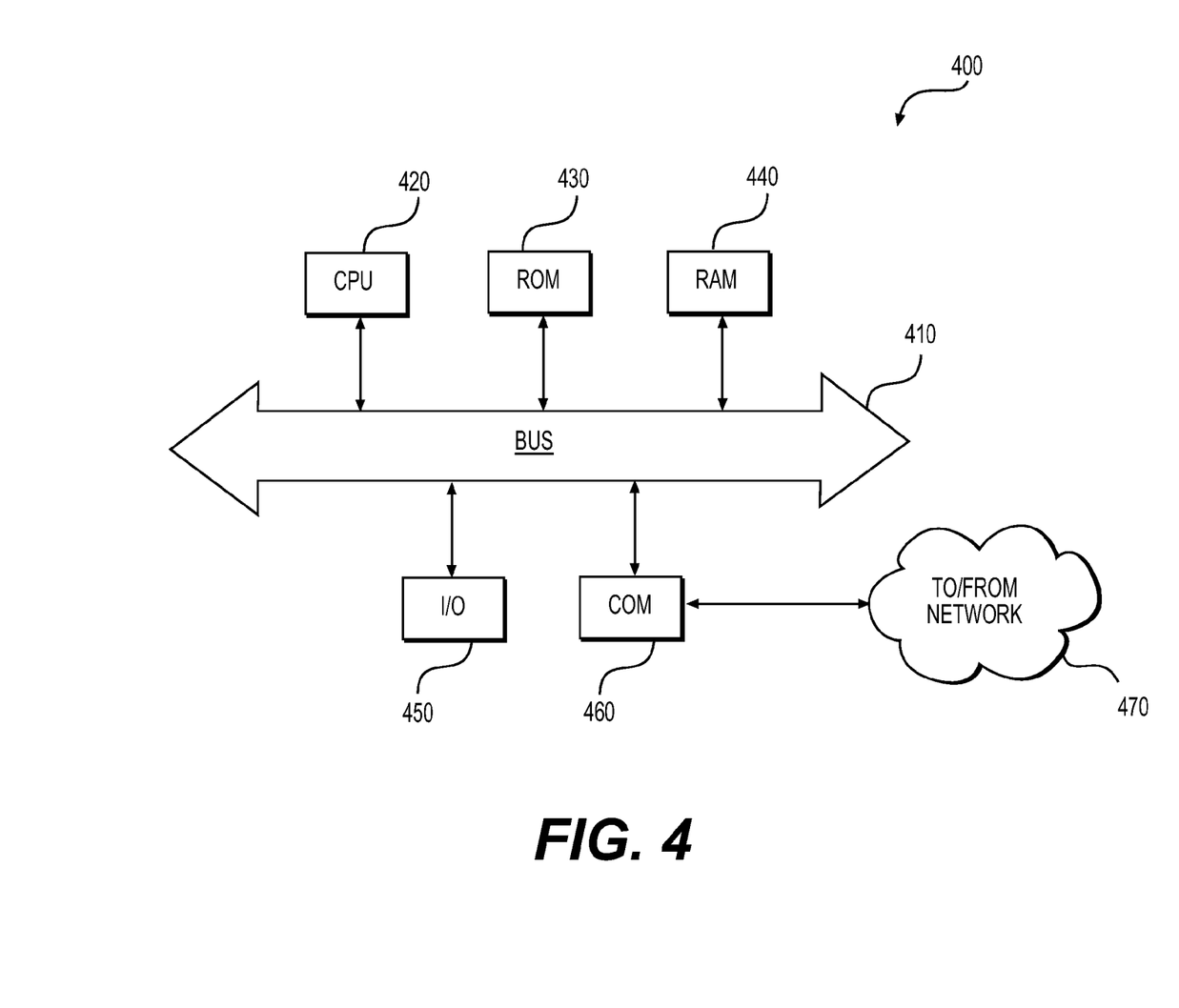
FIG. 4 is a simplified functional block diagram of a computer configured to function according to exemplary embodiments of the present disclosure.

FIG. 4 provides a functional block diagram illustration of general purpose computer hardware platforms. FIG. 4 illustrates a network or host computer platform 400, as may typically be used to implement a server, such as the one or more clients 102, servers 106, data stores 114, and the validation system 108. It is believed that those skilled in the art are familiar with the structure, programming, and general operation of such computer equipment and as a result the drawings should be self-explanatory.

A platform for a server or the like 400, for example, may include a data communication interface for packet data communication 460. The platform may also include a central processing unit (CPU) 420, in the form of one or more processors, for executing program instructions. The platform typically includes an internal communication bus 410, program storage, and data storage for various data files to be processed and/or communicated by the platform such as ROM 430 and RAM 440, although the computer platform 400 often receives programming and data via network communications 470. The hardware elements, operating systems, and programming languages of such equipment are conventional in nature, and it is presumed that those skilled in the art are adequately familiar therewith. The computer platform 400 also may include input and output ports 450 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the term "account name" is used above, embodiments described herein may be applied to any account identifier and/or ostensibly user-generated content.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for determining if an account identifier is computer-generated, comprising:
    receiving the account identifier;
    dividing the account identifier into a plurality of fragments;
    calculating a first feature of the plurality of fragments of the account identifier by calculating fragment frequencies of each of the plurality of fragments relative to a plurality of fragments associated with a plurality of account identifiers;
    calculating a second feature of the account identifier by classifying alphanumeric character types of the account identifier;
    calculating a third feature of the plurality of fragments of the account identifier by hashing the fragment frequencies to a commonness of each of the plurality of fragments of the account identifier; and
    generating a plurality of data pairs, each data pair comprising a fragment of the plurality of fragments and an associated feature value, the associated feature value comprising the first feature, the second feature, or the third feature;
    providing each of the plurality of data pairs to a probabilistic classifier model to determine if the account identifier is computer-generated.

2. The method of claim 1, wherein, in response to determining that the at least one of the fragments of the account identifier cannot be found in the plurality of account identifiers, increasing a probability that the account identifier is computer-generated.

3. The method of claim 1, wherein the probabilistic classifier model is trained with a training set of a plurality of account identifiers that are known to be or known to not be computer-generated, and wherein the training set allows the probabilistic classifier model to independently weigh the first feature, second feature, and third feature in order to more accurately determine if the account identifier is computer-generated.

4. The method of claim 1, further comprising:
    calculating one or more features of the account identifier by counting characters by character type.

5. The method of claim 1, wherein at least one of the plurality of fragments is truncated to contain only consonants.

6. The method of claim 1, wherein each character of at least one of the plurality of fragments is hashed according to character type.

7. The method of claim 6, wherein each character type is selected from a group including consonant, vowel, number, and punctuation mark.

8. A system for determining if an account identifier is computer-generated, the system including:
    a data storage device storing instructions determining if an account identifier is computer-generated; and
    a processor configured to execute the instructions to perform a method including:
        receiving the account identifier;
        dividing the account identifier into a plurality of fragments;
        calculating a first feature of the plurality of fragments of the account identifier by calculating fragment frequencies of each of the plurality of fragments relative to a plurality of fragments associated with a plurality of account identifiers;
        calculating a second feature of the account identifier by classifying alphanumeric character types of the account identifier;
        calculating a third feature of the plurality of fragments of the account identifier by hashing the fragment frequencies to a commonness of each of the plurality of fragments of the account identifier; and
        generating a plurality of data pairs, each data pair comprising a fragment of the plurality of fragments and an associated feature value, the associated feature value comprising the first feature, the second feature, or the third feature;
        providing each of the plurality of data pairs to a probabilistic classifier model to determine if the account identifier is computer-generated.

9. The system of claim 8, wherein, in response to determining that the at least one of the fragments of the account identifier cannot be found in the plurality of account identifiers, increasing a probability that the account identifier is computer-generated.

10. The system of claim 8, wherein the probabilistic classifier model is trained with a training set of a plurality of account identifiers that are known to be or known to not be computer-generated, and wherein the training set allows the probabilistic classifier model to independently weigh the first feature, second feature, and third feature in order to more accurately determine if the account identifier is computer-generated.

11. The system of claim 8, wherein the processor is further configured for:
    calculating one or more features of the account identifier by counting characters by character type.

12. The system of claim 8, wherein at least one of the plurality of fragments is truncated to contain only consonants.

13. The system of claim 8, wherein each character of at least one of the plurality of fragments is hashed according to character type.

14. A non-transitory computer-readable medium storing instructions that, when executed by a processor, cause the processor to perform a method for determining whether an account identifier is computer-generated, the method including:
    receiving the account identifier;
    dividing the account identifier into a plurality of fragments;
    calculating a first feature of the plurality of fragments of the account identifier by calculating fragment frequencies of each of the plurality of fragments relative to a plurality of fragments associated with a plurality of account identifiers;

calculating a second feature of the account identifier by classifying alphanumeric character types of the account identifier;

calculating a third feature of the plurality of fragments of the account identifier by hashing the fragment frequencies to a commonness of each of the plurality of fragments of the account identifier; and generating a plurality of data pairs, each data pair comprising a fragment of the plurality of fragments and an associated feature value, the associated feature value comprising the first feature, the second feature, or the third feature;

providing each of the plurality of data pairs to a probabilistic classifier model to determine if the account identifier is computer-generated.

15. The non-transitory computer-readable medium of claim 14, wherein, in response to determining that the at least one of the fragments of the account identifier cannot be found in the plurality of account identifiers, increasing a probability that the account identifier is computer-generated.

16. The non-transitory computer-readable medium of claim 14, wherein the probabilistic classifier model is trained with a training set of a plurality of account identifiers that are known to be or known to not be computer-generated, and wherein the training set allows the probabilistic classifier model to independently weigh the first feature, second feature, and third feature in order to more accurately determine if the account identifier is computer-generated.

17. The non-transitory computer-readable medium of claim 14, wherein each character of at least one of the plurality of fragments is hashed according to character type.

* * * * *